Oct. 30, 1934.  C. R. MALMBERG  1,978,468
BEDPAN
Filed Sept. 6, 1932
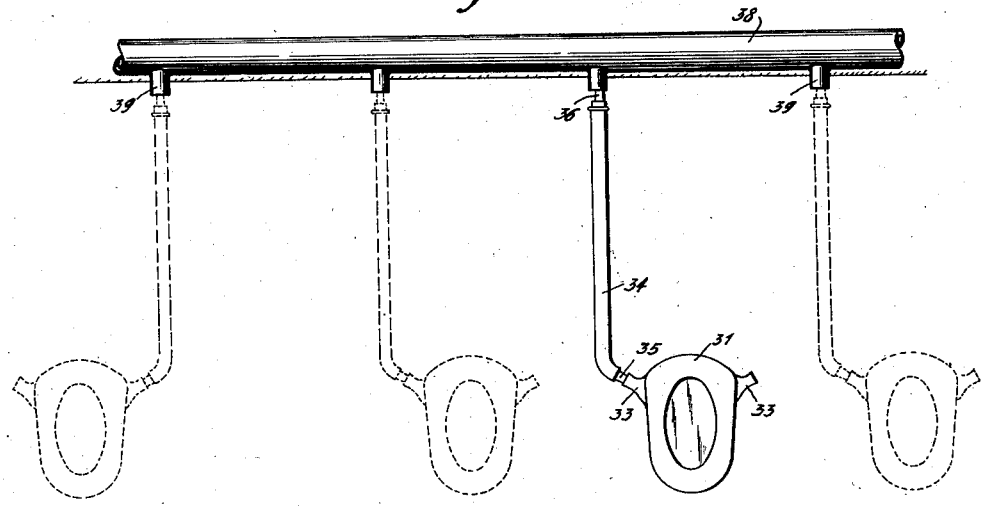
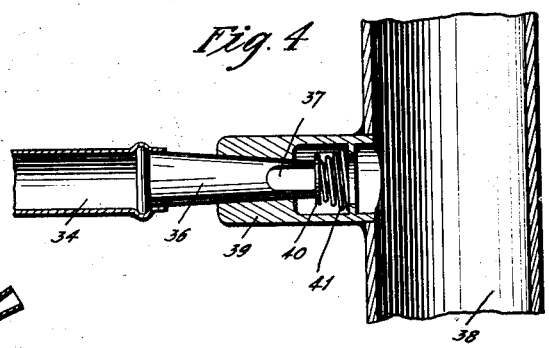
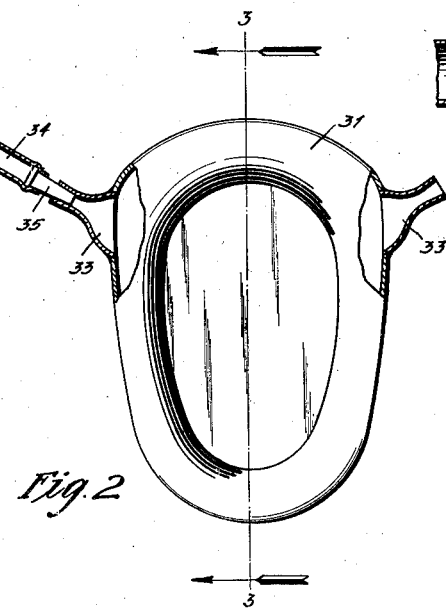
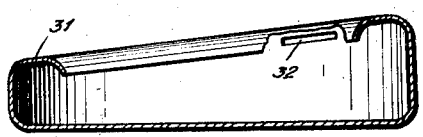
Inventor
Clarence R. Malmberg
by Orwig & Hague Attys.

Patented Oct. 30, 1934

1,978,468

UNITED STATES PATENT OFFICE 1,978,468

BEDPAN

Clarence R. Malmberg, Boone, Iowa

Application September 6, 1932, Serial No. 631,799

2 Claims. (Cl. 4—112)

The object of my invention is to provide a bed pan of simple, durable and inexpensive construction, and provided with means of simple, durable and inexpensive construction whereby odors from the interior of the bed pan may be readily, quickly and safely carried to a point of discharge.

More specifically it is my object to provide a bed pan of this character in which there is provided at opposite sides of the bed pan a combined nozzle and handle device so arranged and positioned that either one of them may be used as a nozzle to connect it with a discharge hose, or as a handle, and the device at the opposite side not connected with the discharge hose may serve as an intake passageway for air passing across the interior of the bed pan to carry the odors therefrom into the combined nozzle and handle device being used as an air discharge, and also in this connection to provide a device of this character which may be conveniently and easily used on either the right or left side of the bed.

A further object is to provide improved simple and efficient means for automatically connecting a flexible hose with the bed pan and with a pipe in which there is an established exhaust air flow, so that the operator may simply connect the flexible hose attached to the bed pan with any one of a number of inlet ports in said exhaust pipe to thereby automatically start the flow of air through the bed pan and into said pipe.

My invention consists in the construction, arrangement and combination of the various parts of the device, whereby the objects contemplated are attained, as hereinafter more fully set forth, pointed out in my claims, and illustrated in the accompanying drawing, in which:

Figure 1 shows a plan view illustrating my improved bed pan and the connections therewith leading to a point of discharge for air exhausted from the bed pan. The dotted lines show various bed pans connected with the same exhaust pipe. The one to the left of Figure 1 shows the flexible hose connected to the combined nozzle and handle device at the right of the pan.

Figure 2 shows a top or plan view partly in section of my improved bed pan with a flexible hose connected to one of the combined nozzle and handle devices.

Figure 3 shows a sectional view on the line 3—3 of Figure 2.

Figure 4 shows an enlarged detail sectional view illustrating the spring closed valve device for connecting the flexible hose with the exhaust pipe.

Referring to the accompanying drawing, I have used the reference numeral 31 to indicate generally a bed pan of ordinary construction, having at its top an inwardly and downwardly extending flange forming a seat. On opposite sides of said bed pan, and under the said flange and near the top of the bed pan I have formed slots 32, each communicating with the interior of a combined nozzle and handle device 33. These are preferably located at the sides of the bed pan near the wide end thereof.

For conducting odors from the bed pan, I have provided a flexible hose 34, having a tubular extension 35 at one end designed to fit into the combined nozzle and handle device 33, as shown in Figure 2. At the other end of the hose 34 is a nozzle device 36 preferably tapered and having openings 37 at opposite sides of its outer end.

A pipe 38 is provided and this is preferably extended adjacent to the wall of hospitals or the like, and it is provided at intervals with projecting valve devices 39, each of which has an opening to receive the nozzle 36 and a spring closed valve 40 to normally cover said opening, the spring being indicated by the reference numeral 41.

In practical use with my improved device, the operator may conveniently use the bed pan either on the right or left side of the bed, or the right or left side of the patient, by grasping the proper one of the combined nozzle and handle devices 33, and thereby placing the pan in position for use.

When this has been done, the hose 34 is connected to the proper combined nozzle and handle device and to the pipe 38, and when connection is made and an exhaust current of air is made to travel through the pipe 38 by any ordinary means, then during the time the bed pan is being occupied, a current of air will enter through the combined nozzle and handle device 33 opposite the one connected to the hose 34, and this air will pass through the interior of the bed pan and out to a point of discharge. Liquids within the pan will be prevented from passing out with the air, because of the location of the slots 32 under the flange at the top of the bed pan, and furthermore the fact that a patient is seated upon the bed pan, and thereby forms a substantially air tight seal against the seat, will not in any way affect the operation of my improved bed pan, because the air can enter through the combined nozzle and handle device and across the bed pan to the point of discharge.

With my improved valve device leading to the exhaust pipe, the operator need only insert the nozzle device 36 into the valve device and the spring valve is thereby automatically opened and held open so long as the hose is in position.

I claim as my invention:

1. A device of the class described comprising a bed pan formed with an inwardly and downwardly extended flange forming a seat, of two combined nozzle and handle devices at opposite sides thereof, each formed with a slot entering the pan under said flange and near the top of the pan, a flexible hose detachably connected to either of said nozzle and handle device, a pipe for conducting air from the pan, a spring closed inlet valve in said pipe, and a nozzle on said hose having openings at its sides designed to enter said pipe and open the spring closed valve, for the purposes stated.

2. In a device of the class described, a bed pan, a hollow handle fixed to and extended outwardly from the bed pan and designed to receive a hose, the said pan being formed with a slot near its upper edge communicating with said hollow handle, and a flange formed at the top of the pan and projected inwardly and downwardly to form a seat and being positioned in spaced apart relation to said slot, to thereby hold a user's body away from the slot.

CLARENCE R. MALMBERG.